(12) United States Patent
Lee et al.

(10) Patent No.: US 11,468,373 B2
(45) Date of Patent: Oct. 11, 2022

(54) PROCESSING UNSTRUCTURED DATA FOR DATA PROCESSING SYSTEM

(71) Applicant: SAP SE, Walldorf (DE)

(72) Inventors: Justin Gregory Lee, San Francisco, CA (US); Richard Takeshi Shimano, San Francisco, CA (US); Samantha Kindersley Ronngard, San Francisco, CA (US); Christopher James Beaty, San Francisco, CA (US); Olivier Mercier, San Francisco, CA (US); Masayo Okamoto, San Francisco, CA (US); James Edwin Sanders, San Francisco, CA (US); Harold Alan Liss, San Francisco, CA (US); Betsy Le Moeller, San Francisco, CA (US); Nancy Wu Grove, San Francisco, CA (US); Zoran Milic, San Francisco, CA (US); Ningchuan Wan, San Francisco, CA (US)

(73) Assignee: SAP SE, Walldorf (DE)

( * ) Notice: Subject to any disclaimer, the term of this patent is extended or adjusted under 35 U.S.C. 154(b) by 678 days.

(21) Appl. No.: 16/428,807

(22) Filed: May 31, 2019

(65) Prior Publication Data
US 2020/0380423 A1 Dec. 3, 2020

(51) Int. Cl.
*G06F 17/00* (2019.01)
*G06Q 10/02* (2012.01)
(Continued)

(52) U.S. Cl.
CPC ............ *G06Q 10/02* (2013.01); *G06F 40/10* (2020.01); *G06F 40/205* (2020.01); *G06Q 10/107* (2013.01); *G06Q 10/1093* (2013.01)

(58) Field of Classification Search
CPC ....... G06F 40/10; G06F 40/205; G06Q 10/02; G06Q 10/107; G06Q 10/1093
See application file for complete search history.

(56) References Cited

U.S. PATENT DOCUMENTS

| 6,360,205 B1 | 3/2002 | Iyengar et al. |
|---|---|---|
| 7,158,980 B2 | 1/2007 | Shen |
| (Continued) | | |

OTHER PUBLICATIONS

Tseytlin, Yan, et al, "Method by Which Information is Shared Given a Time, Date, or Location to Enhance Historical Significance of Web Based Content", IP.com No. IPCOM000236538, published online May 1, 2014, pp. 1-28 (Year: 2014).*

*Primary Examiner* — Laurie A Ries
(74) *Attorney, Agent, or Firm* — Fountainhead Law Group P.C.

(57) ABSTRACT

Some embodiments provide a non-transitory machine-readable medium that stores a program. Upon receiving an email from a client device, the program determines a datamap from a plurality of datamaps that corresponds to the email. The program further uses the determined datamap to parse the email and extract data from the email. Based on the extracted data from the email, the program also determines that the email is a cancelation for a first event. The program further determines that the cancelation for the first event matches a second event of a collection of events. The program also associates the cancelation for the first event with the second event of the collection of events.

20 Claims, 10 Drawing Sheets

(51) Int. Cl.
*G06Q 10/10* (2012.01)
*G06F 40/10* (2020.01)
*G06F 40/205* (2020.01)

(56) References Cited

U.S. PATENT DOCUMENTS

| | | | |
|---|---|---|---|
| 8,412,696 B2* | 4/2013 | Zhang | G06F 16/2471 |
| | | | 707/706 |
| 9,842,319 B2* | 12/2017 | Carroll | G06Q 10/107 |
| 11,119,985 B1* | 9/2021 | Alagianambi | G06F 21/6245 |
| 2002/0173978 A1 | 11/2002 | Boies et al. | |
| 2004/0044674 A1 | 3/2004 | Mohammadioun et al. | |
| 2004/0267555 A1 | 12/2004 | Dale | |
| 2005/0288973 A1 | 12/2005 | Taylor et al. | |
| 2006/0106655 A1 | 5/2006 | Lettovsky et al. | |
| 2006/0277079 A1 | 12/2006 | Gilligan et al. | |
| 2007/0067193 A1 | 3/2007 | Robertson | |
| 2007/0094056 A1 | 4/2007 | Kang et al. | |
| 2007/0143155 A1 | 6/2007 | Whitsett et al. | |
| 2007/0271129 A1* | 11/2007 | Dutton | G06Q 10/109 |
| | | | 705/7.16 |
| 2008/0091504 A1* | 4/2008 | Lyle | G06Q 10/063116 |
| | | | 705/7.19 |
| 2009/0012824 A1 | 1/2009 | Brockway et al. | |
| 2010/0146058 A1* | 6/2010 | Naef | G06Q 10/109 |
| | | | 709/206 |
| 2010/0228577 A1* | 9/2010 | Cunningham | G06Q 10/02 |
| | | | 705/5 |
| 2011/0106892 A1* | 5/2011 | Nelson | G06Q 10/109 |
| | | | 709/206 |
| 2014/0250122 A1* | 9/2014 | Fredericks | G06Q 10/10 |
| | | | 707/736 |
| 2015/0341300 A1* | 11/2015 | Swain | H04L 51/02 |
| | | | 707/738 |
| 2018/0211206 A1* | 7/2018 | Baxter | G06Q 30/0631 |
| 2020/0050976 A1* | 2/2020 | Lowe | G06Q 50/14 |
| 2020/0184018 A1* | 6/2020 | Lal | H04L 51/02 |
| 2021/0224365 A1* | 7/2021 | Huang | G06F 11/3438 |
| 2021/0383284 A1* | 12/2021 | Bayer | G06Q 10/025 |
| 2022/0004408 A1* | 1/2022 | Mathew | G06F 9/45512 |

* cited by examiner

Booking cancellation

Dear Customer,  Booking reference: VRQ76W

Your ACME Airways flight booking has been cancelled.

Cancelled booking details

| Passengers | MRS JANE DO |
|---|---|
| Ticket Number(s) | 125-8931751310 |

Cash refund

| Fare refund | Tax refund | Less cancellation fee | Total refund due |
|---|---|---|---|
| USD 69.00 | USD 50.52 | USD 0.00 | USD 119.52 |

| Refunded to card type | American Express |
|---|---|
| Refunded to card number | **********1002 |

The value will appear on the card account in the near future.

FIG. 3

```
ACME Airways HTML Flight Cancellation
Matches confirmations that classify to AA_v24-a-html.en.map include: date_time.def
include: titles.def
include: air_reservation.def
include: extractor.def

[_Default_]
root: Booking
content_type: text/html attribute: (@\s*Booking\s*[Cc]ancellation{{all_extractor_req}}Dear\s*Customer\W*{{all_extractor_req}}Booking\s*reference\W*{{pnr_code}}', 100)
attribute: ('(@\s*Your\s*\w{^@}{1,50}\s*flight\s*booking\s*has\s*been\s*cancelled\W*{{all_extractor_req}}Cancelled\s*booking\s*details', 200)
attribute: (@\s*Passengers{{all_extractor_req}}\w{^@}{1,100}(?=@){{all_extractor_req}}Ticket\s*Number(s\){{all_extractor_req}}){{std_ticket_num}}', 100)
attribute: ('(@\s*Cash\s*refund{{all_extractor_req}}Fare\s*refund{{all_extractor_req}}Tax\s*refund{{all_extractor_req}}Less\s*cancellation\s*fee', 100)

[Booking]
contains: AirReservation

[AirReservation]
contains: AirReservationMetadata
contains: AirSupplierConfirmation
requires: AirSegment
contains: AirTraveler
```

FIG. 4A

```
pattern: (?i)(?P<booking_site_name>ACME\s*Airways)
replace_re: 'booking_site_name', '(?i)^ACME\s*Airways$', 'ACME Airways'

[AirReservationMetadata]
pattern: Your\s*ACME\s*Airways\s*flight\s*booking\s*has\s*been\s*(?P<is_cancellation>cancelled)
replace_re: 'is_cancellation', 'cancelled', 'true'

[AirSupplierConfirmation]
group_by: confirmation_num
pattern: Booking\s*reference\W{{pnr_code::confirmation_num}}

[AirSegment]
pattern: (?P<marketing_airline>ACME\s*Airways)

[AirTraveler]
begin_zone: Passengers
end_zone: Ticket
group_by: traveler_id
pattern: @\s*{{titles_en}}\s*(?P<traveler_id>(?P<f_name>[A-Za-z][A-Za-z\.\'\-]+)(\s+(?P<m_name>[A-Za-z][A-Za-z\.\'\-]+))?\s+(?P<l_name>[A-Za-z][A-Za-z\.\'\-]+))
```

FIG. 4B

```xml
<?xml version='1.0' encoding='UTF-8'?>
<Booking>
    <datamap_version>AA_v24-a-html.en.map</datamap_version>  ← 510
    <email_date>2018-10-18</email_date>  ← 515
    <email_from_address>jdoe@email.com</email_from_address>  ← 520
    <mail_client></mail_client>
    <missed_mdos></missed_mdos>
    <total_mdos>5</total_mdos>
    <total_missed_mdos>0</total_missed_mdos>
    <AirObject>  ← 525
      <CancellationDateTime/>
      <booking_site_name>ACME Airways</booking_site_name>  ← 530
      <supplier_conf_num>VRQ76W</supplier_conf_num>  ← 535
      <is_cancellation>true</is_cancellation>  ← 540
      <Agency/>
      <Segment>
        <StartDateTime/>
        <EndDateTime/>
        <start_airport_code/>
        <start_city_name/>
        <start_gate/>
        <start_terminal/>
        <end_airport_code/>
        <end_city_name/>
        <end_gate/>
        <end_terminal/>
        <marketing_airline>ACME Airways</marketing_airline>
        <seats/>
      </Segment>
      <Traveler>  ← 545
        <last_name>DOE</last_name>  ← 550
        <first_name>JANE</first_name>  ← 555
      </Traveler>
    </AirObject>
</Booking>
```

FIG. 5

PROCESSING UNSTRUCTURED DATA FOR DATA PROCESSING SYSTEM

SUMMARY

In some embodiments, a non-transitory machine-readable medium stores a program. Upon receiving an email from a client device, the program determines a datamap from a plurality of datamaps that corresponds to the email. The program further uses the determined datamap to parse the email and extract data from the email. Based on the extracted data from the email, the program also determines that the email is a cancelation for a first event. The program further determines that the cancelation for the first event matches a second event of a collection of events. The program also associates the cancelation for the first event with the second event of the collection of events.

In some embodiments, the program may further receive a request from the client device for the collection of events and send the client device the collection of events and the associated cancelation of the first event. The program may further receive from the client device an indication of a confirmation of the cancelation of the first event and, in response to receiving the indication, delete the second event from the collection of events. The program may further receive from the client device an indication to keep the second event of the collection of events and, in response to receiving the indication, remove the cancelation of the first event from the collection of events.

In some embodiments, the program may further identify a user account associated with a user of the client device. Determining that the cancelation for the first event matches the second event of the collection of events may include retrieving a set of collection of events associated with the user account and identifying a collection of events from the set of collection of events as the collection of events having the second event. Determining the datamap from the plurality of datamaps that corresponds to the email may include generating a score for each datamap in a subset of the plurality of datamaps and based on the scores, identifying the datamap with the highest score as the determined datamap. Each datamap in the plurality of datamaps may be configured to parse a particular type of email sent from a particular entity and extract data from the particular type of email sent from the particular entity.

In some embodiments, upon receiving an email from a client device, a method, executable by a device, determines a datamap from a plurality of datamaps that corresponds to the email. The method further uses the determined datamap to parse the email and extract data from the email. Based on the extracted data from the email, the method also determines that the email is a cancelation for a first event. The method further determines that the cancelation for the first event matches a second event of a collection of events. The method also associates the cancelation for the first event with the second event of the collection of events.

In some embodiments, the method may further receive a request from the client device for the collection of events and send the client device the collection of events and the associated cancelation of the first event. The method may further receive from the client device an indication of a confirmation of the cancelation of the first event and, in response to receiving the indication, delete the second event from the collection of events. The method may further receive from the client device an indication to keep the second event of the collection of events and, in response to receiving the indication, remove the cancelation of the first event from the collection of events.

In some embodiments, the method may further identify a user account associated with a user of the client device. Determining that the cancelation for the first event matches the second event of the collection of events may include retrieving a set of collection of events associated with the user account and identifying a collection of events from the set of collection of events as the collection of events having the second event. Determining the datamap from the plurality of datamaps that corresponds to the email may include generating a score for each datamap in a subset of the plurality of datamaps and, based on the scores, identifying the datamap with the highest score as the determined datamap. Each datamap in the plurality of datamaps may be configured to parse a particular type of email sent from a particular entity and extract data from the particular type of email sent from the particular entity.

In some embodiments, a system includes a set of processing units and a non-transitory machine-readable medium that stores instructions. Upon receiving an email from a client device, the instructions cause at least one processing unit to determine a datamap from a plurality of datamaps that corresponds to the email. The instructions further cause the at least one processing unit to use the determined datamap to parse the email and extract data from the email. Based on the extracted data from the email, the instructions also cause the at least one processing unit to determine that the email is a cancelation for a first event. The instructions further cause the at least one processing unit to determine that the cancelation for the first event matches a second event of a collection of events. The instructions also cause the at least one processing unit to associate the cancelation for the first event with the second event of the collection of events.

In some embodiments, the instructions may further cause the at least one processing unit to receive a request from the client device for the collection of events and send the client device the collection of events and the associated cancelation of the first event. The instructions may further cause the at least one processing unit to receive from the client device an indication of a confirmation of the cancelation of the first event and, in response to receiving the indication, delete the second event from the collection of events. The instructions further cause the at least one processing unit to receive from the client device an indication to keep the second event of the collection of events and, in response to receiving the indication, remove the cancelation of the first event from the collection of events.

In some embodiments, the instructions may further cause the at least one processing unit to identify a user account associated with a user of the client device. Determining that the cancelation for the first event matches the second event of the collection of events may include retrieving a set of collection of events associated with the user account and identifying a collection of events from the set of collection of events as the collection of events having the second event. Determining the datamap from the plurality of datamaps that corresponds to the email may include generating a score for each datamap in a subset of the plurality of datamaps and, based on the scores, identifying the datamap with the highest score as the determined datamap.

The following detailed description and accompanying drawings provide a better understanding of the nature and advantages of the present invention.

BRIEF DESCRIPTION OF THE DRAWINGS

FIG. 3 illustrates an example cancelation email for a travel plan according to some embodiments.

FIGS. 4A and 4B illustrate a datamap for processing the cancelation email illustrated in FIG. 3 according to some embodiments.

FIG. 5 illustrates an extensible markup language (XML) file generated based on the cancelation email illustrated in FIG. 3 and the datamap illustrated in FIGS. 4A and 4B according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for processing cancelations of travel plans. In some embodiments, a user of a client device may cancel a travel plan reserved with a particular entity (e.g., a vendor). The user of the client device can then receive a cancelation email for the travel plan from the entity. In response, the user of the client device may send the cancelation email for the travel plan to a computing system configured for managing travel plans. When the computing system receives the cancelation email, the computing system is not yet aware that the email is a cancelation email for a travel plan. Thus, the computing system parses the email and extracts data to determine that the email is a cancelation email for a travel plan. Next, the computing system identifies an existing trip that includes a travel plan that corresponds to the travel plan that the cancelation email is for. The computing system then associates the cancelation of the travel plan with the travel plan of the identified trip. This way, when the user of the client device sends the computing system a request for the trip, the computing system can send the client device the trip, which includes the travel plan, and the cancelation of the travel plan.

The techniques described in the present application provide a number of benefits and advantages over conventional methods for managing travel plans. For example, the techniques allow a computing system to process cancelation emails for travel plans reserved at a variety of different vendors in an efficient and automated manner Conventional travel plan management systems are unable to process cancelation emails in such a manner and/or they require manual processing of cancelation emails.

Figure 1:
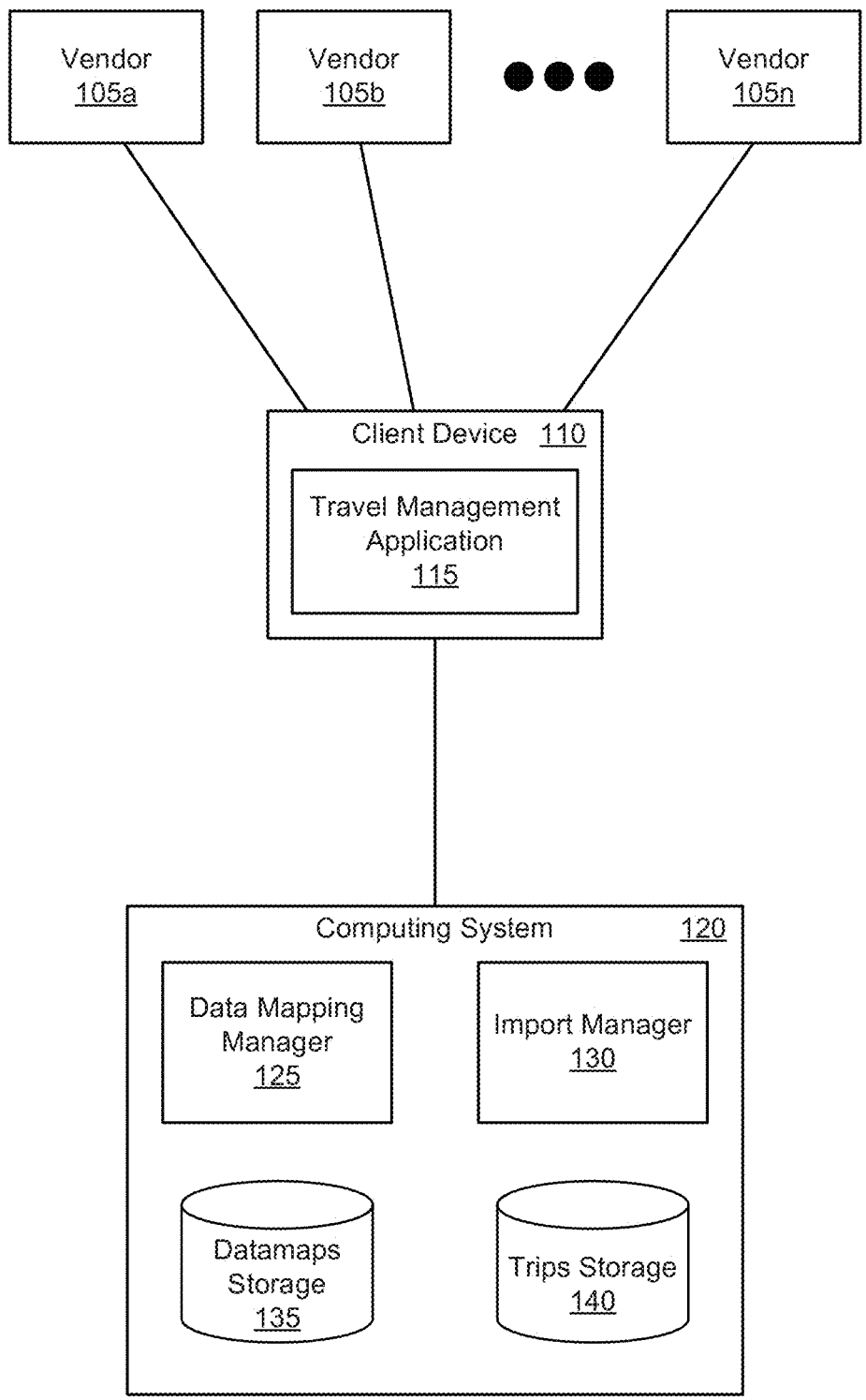
FIG. 1 illustrates a system for processing cancelations of travel plans according to some embodiments.

FIG. 1 illustrates a system 100 for processing cancelations of travel plans according to some embodiments. As shown, system 100 includes vendors 105a-n, client device 110, and computing system 120. Each of the vendors 105a-n is an entity offering one or more services or items for sale. In some embodiments, vendors 105a-n are travel-related vendors. Examples of such vendors include airlines, hotels, motels, car rentals, cruise lines, railway companies, restaurants, amusement parks, etc. In some embodiments, each vendor 105 includes a computing device that is configured to send communications to client device 110. For instance, when a user of client device 110 makes a reservation for travel plans with a vendor 105 (e.g., via a website provided by the vendor 105), the computing device of the vendor 105 can send client device 110 a confirmation email for the reservation. At some point before the time of the reservation, the computing system of the vendor 105 may send client device 110 a reminder email for the reservation. If the user of the client device 110 cancels the reservation (e.g., via a website provided by the vendor 105), the computing device of the vendor 105 can send client device 110 a cancelation email for the reservation.

Client device 110 is configured to communicate and interact with vendors 105a-n. For example, a user of client device 110 may access a vendor 105 (e.g., via a website provided by the vendor 105) in order to make a reservation for a travel plan. In response, client device 110 can receive from the vendor 105 a confirmation email for the reservation. A user of client device 110 can forward the confirmation email to computing system 120 (e.g., to a particular email address that belongs to computing system 120) for processing. In some cases, client device 110 might receive from the vendor 105 a reminder email for the reservation at some time before the reservation. If the user of the client device 110 accesses the vendor (e.g., via a website provided by the vendor 105) to cancel a reservation for a travel plan, client device 110 can receive a cancelation email for the reservation of the travel plan. The user of client device 110 may forward the cancelation email to computing system 120 (e.g., to a particular email address that belongs to computing system 120) for processing.

As illustrated in FIG. 1, client device 110 includes travel management application 115, which is configured to communicate and interact with computing system 120. For instance, a user of client device 110 may use travel management application 115 to access trips associated with the user and managed by computing system 120. The user of client device 110 can send computing system 120, via travel management application 115, a request for particular trips associated with the user. When travel management application 115 receives the requested trips, client device 110 may display them (e.g., on a display of client device 110) for viewing. The user of client device 110 may select any of the received trips to review details about the trip (e.g., travel plans of with the trip). While viewing a trip, if a travel plan of the trip has a cancelation associated with it, travel management application 115 may provide a notification indicating so. If the user selects the notification, travel management application 115 may provide the user a prompt to confirm the cancelation of the travel plan, keep the travel plan, or ignore the notification. If the user selects to confirm the cancelation of the travel plan, travel management application 115 sends selection to computing system 120. Similarly, if the user selects to keep the travel plan, travel management application 115 sends the selection to computing system 120. If the user selects to ignore the notification, travel management application 115 removes the prompt until the next time the user selects the notification.

In some embodiments, a trip can include one or more attributes such as a trip identifier (ID) for uniquely identifying the trip, one or more user account IDs (e.g., email addresses of users) that are allowed to access the trip, a start date of the trip, an end date of the trip, a destination of the trip, etc. In some such embodiments, a trip can include one or more trip items that computing system generates and adds to the trip. Examples of trip items include maps around the area of the destination of the trip, directions between various locations in the trip (e.g., directions between the arrival airport and the accommodations, directions between the accommodations and reserved restaurants, etc.), points of interest near accommodations in the trip, etc. In some embodiments, a trip may include one or more reservations for travel-related services or items. A reservation can include a reservation type. Examples of reservation types include a hotel reservation, a flight reservation, a car rental reservation, an accommodation reservation, a cruise reservation, a restaurant reservation, etc. Each reservation can also include a start date of the reservation, an end date of the reservation, a set of reservation numbers (e.g., a supplier confirmation number and/or a booking site confirmation number), a record locator, etc. Different reservation types can include additional and/or different information. For example, a hotel reservation may include a name of the hotel, an address of the hotel, etc. A flight reservation can include a departure airport, a departure time, an arrival airport, an arrival time, etc. A car rental reservation may include a name of the car rental, an address or location where to pick up a rental car, a date on which to pick up the rental car, an address or location where to drop off the rental car, a date on which to drop off the rental car, etc.

Each reservation may include one or more travel plans. For instance, a flight reservation can include a travel plan for each flight segment in the flight reservation. Each such travel plans includes a flight number of the flight segment, a departure airport of the flight segment, a departure date of the flight segment, a departure time of the flight segment, an arrival airport of the flight segment, an arrival date of the flight segment, an arrival time of the flight segment, etc. A hotel reservation may include a travel plan for checking into the hotel and a travel plan for checking out of the hotel. A car rental reservation may include a travel plan for picking up the rental car and a travel plan for dropping off the car.

While FIG. 1 shows client device 110 including travel management application 115, one of ordinary skill in the art will appreciate that travel management application 115 may be implemented differently in different embodiments. For example, travel management application 115 may be implemented in computing system 120 (e.g., as a cloud application) and client device 110 can access and interact with such travel management application via a web browser operating on client device 110.

As shown in FIG. 1, computing system 120 includes data mapping manager 125, import manager 130, datamaps storage 135, and trips storage 140. Datamaps storage 135 is configured to store datamaps for processing emails. In some embodiments, a datamap can be configured to parse and extract data from emails sent from a particular vendor 105. For example, a first datamap can be configured to parse and extract data from emails from vendor 105A, a second datamap can be configured to parse and extract data from emails from vendor 105B, a third datamap can be configured to parse and extract data from emails from vendor 105C, and so on and so forth. A datamap can be further configured to parse and extract data from one or more types of email sent from a particular vendor 105. For example, a datamap may be configured to parse and extract data from confirmation emails for reservations sent from vendor 105A and cancelation emails for reservations sent from vendor 105A. Different datamaps may be further configured to parse and extract data from different types of emails sent from a particular vendor 105. For instance, a first datamap can be configured to parse and extract data from a first type of emails (e.g., confirmation emails for reservations) from vendor 105A, a second datamap can be configured to parse and extract data from a second type of emails (e.g., cancelation emails for reservations) from vendor 105A, a third datamap can be configured to parse and extract data from a third type of emails from vendor 105A, etc. A datamap can be further configured to parse and extract data from a particular email format (e.g., an email formatted using hypertext markup language (HTML) or an email formatted using plain text). A datamap can also be further configured to parse and extract data from email attachments in a particular file format (e.g., an email attachment formatted as a portable document format (PDF)). In some embodiments, a datamap is implemented as a script that includes sets of regular expressions to parse and extract data from emails.

Trips storage 140 stores trips associated with users. In some embodiments, storages 135 and 140 are implemented in a single physical storage while, in other embodiments, storages 135 and 140 may be implemented across several physical storages. While FIG. 1 shows storages 135 and 140 as part of computing system 120, one of ordinary skill in the art will appreciate that datamaps storage 135 and/or trips storage 140 may be external to computing system 120 in some embodiments.

Mapping manager 125 is configured to process emails received from client device 110. For example, mapping manager 125 may receive from client device 110 a cancelation email for a travel plan (e.g., a forward of a cancelation email for a travel plan that the client device 110 received from a vendor 105). When mapping manager 125 receives such an email, mapping manager 125 does not know yet that the email is a cancelation email. Upon receiving the email, data mapping manager 125 determines a datamap from the datamaps stored in datamaps storage 135 that corresponds to the received email. In some embodiments, each datamap includes a set of regular expressions and a set of corresponding weight values that are used to determine a score associated with the datamap. In some such embodiments, a regular expression specifies a set of characters that define a search pattern. Data mapping manager 125 determines a score for each datamap stored in datamaps storage 135 based on the received email, the set of regular expressions in the datamap, and the set of associated weight values in the datamap.

To determine a score for a datamap, data mapping manager 125 may determine whether the search pattern defined by each regular expression in the set of regular expressions matches a string in the received email. For each regular expression that matches a string in the received email, data mapping manager 125 adds the weight value associated with the regular expression to a running total of weight values. Next, data mapping manager 125 calculates the score for the datamap by dividing the running total of weight values by the maximum possible total of weight values, which is then multiplied by the value 100. The resulting score for the datamap is a value between 0 and 100.

Based on the determined scores, data mapping manager 125 identifies a subset of candidate datamaps from the datamaps stored in datamaps storage 135. In some embodiments, the subset of datamaps includes datamaps having scores above a defined threshold score (e.g., a threshold score of 50, a threshold score of 60, a threshold score of 75, etc.). Data mapping manager 125 then selects the datamap in the subset of candidate datamaps having the highest score as the datamap that corresponds to the received email.

In some embodiments, data mapping manager 125 determines a datamap that corresponds to the received email based on the format of the received email and/or the file format of an attachment included in the received email. For instance, if the received email includes an attachment that is a PDF file, data mapping manager 125 identifies datamaps stored in datamaps storage 135 that are configured to process PDF files. For each identified datamap, data mapping manager 125 determines a score based on the received email, the set of regular expressions in the datamap, and the set of associated weight values in the datamap. Based on the determined scores, data mapping manager 125 identifies a subset of candidate datamaps from the identified datamaps. In some embodiments, the subset of datamaps includes datamaps having scores above a defined threshold score (e.g., a score of 60/100). Next, data mapping manager 125 selects the datamap in the subset of candidate datamaps having the highest score as the datamap that corresponds to the received email. Using this technique, data mapping manager 125 determines scores for only the datamaps stored in datamaps storage 135 that are configured to process PDF files (instead of determining scores for every datamap stored in datamaps storage 135 as described in the aforementioned technique).

In some instances, there may not be any datamaps configured to process PDF files that have a score above the defined threshold score. In some such instances, data mapping manager 125 can identify datamaps stored in datamaps storage 135 that are configured to process emails formatted in the email format of the received email (e.g., an HTML format or a plain text format). For each identified datamap, data mapping manager 125 determines a score based on the received email, the set of regular expressions in the datamap, and the set of associated weight values in the datamap. Based on the determined scores, data mapping manager 125 identifies a subset of candidate datamaps from the identified datamaps. In some embodiments, the subset of datamaps includes datamaps having scores above the defined threshold score. Then, data mapping manager 125 selects the datamap in the subset of candidate datamaps having the highest score as the datamap that corresponds to the received email.

In some cases, there may not be any datamaps configured to process emails formatted in the email format of the received email that have a score above the defined threshold score. In some such cases, data mapping manager 125 can identify remaining datamaps stored in datamaps storage 135 (i.e., datamaps other than the datamaps configured to process PDF files and datamaps that are configured to process emails formatted in the email format of the received email). For each identified datamap, data mapping manager 125 determines a score based on the received email, the set of regular expressions in the datamap, and the set of associated weight values in the datamap. Based on the determined scores, data mapping manager 125 identifies a subset of candidate datamaps from the identified datamaps. In some embodiments, the subset of datamaps includes datamaps having scores above the defined threshold score. Data mapping manager 125 then selects the datamap in the subset of candidate datamaps having the highest score as the datamap that corresponds to the received email.

After identifying the datamap that corresponds to the received email, data mapping manager 125 executes the identified datamap on the received email in order to parse through and extract data from the received email. Next, data mapping manager 125 normalizes the extracted data. For example, data mapping manager 125 converts all the date values into a predefined date format (e.g., MM/DD/YYYY, MM/DD/YY, DD/MM/YYYY, DD/MM/YY, etc.), all the time values into a predefined time format (e.g., HH:MM, HH:MM:SS.S, etc.), all the address values into a predefined address format, and any other types of values that need to be normalized. Once the extracted data has been normalized, data mapping manager 125 generates a file (e.g., an extensible markup language (XML) file) and stores the normalized data in the file. In addition to storing the extracted and normalized data from the received email, data mapping manager 125 also stores data derived from data extracted from the received email. For instance, the datamap used to parse through and extract data from the received email can extract data indicating that the received email is a cancelation email for a travel plan. In such instances, data mapping manager 125 stores a value for a flag in the file indicating that the email is a cancelation email for a travel plan. Finally, data mapping manager 125 sends the file to import manager 130 for processing.

Import manager 130 is configured to convert files into travel plans or cancelations of travel plans. For example, import manager 130 may receive a file from data mapping manager 125. In response to receiving the file, import manager 130 determines whether the received email is a confirmation email for a reservation or a cancelation email for a travel plan based on data in the file. Specifically, import manager 130 looks at the value of the flag mentioned above for indicating whether the email is a cancelation email for a travel plan. If the value for the flag in the file indicates that the email is a cancelation email for a travel plan, import manager 130 accesses trips storage 140 and retrieves trips associated with the sender email address field of the received email (which has been extracted from the received email and stored in the file by data mapping manager 125). Next, import manager 130 determines whether the cancelation of the travel plan matches a travel plan of one of the retrieved trips. To determine whether the cancelation of the travel plan matches a particular travel plan of a particular trip in the retrieved trips, import manager 130 determines whether the file includes a record locator. In some embodiments, a record locator is a used to group travel objects and trip remarks into a single booking. In some embodiments, a record locator is a unique identifier generated by an airline vendor's reservation system that refers to a reservation for a passenger on a flight. If import manager 130 determines that the file includes a record locator, import manager 130 determines whether the particular travel plan of the particular trip includes a record locator. If so, import manager 130 determines whether the record locators match. If they do not match, import manager 130 determines that the cancelation of the travel plan does not match the particular travel plan of the particular trip. If the file does not include a record locator; the particular travel plan of the particular trip does not include a record locator; or the file includes a record locator and the particular travel plan of the particular trip includes a record locator, but the record locators match, import manager 130 attempts to determine whether the cancelation of the travel plan matches the particular travel plan of the particular trip based on supplier confirmation numbers.

In some embodiments, a supplier confirmation number is a unique identifier generated and used by a supplier (e.g., a vendor 105) to identify a reservation in the supplier's system. In some such embodiments, a supplier confirmation number is included in a booking confirmation email and/or electronic ticket. For instance, when a user of client device 110 makes a reservation for travel plans directly with a vendor 105 (e.g., via a website provided by the vendor 105), client device 110 may receive an email confirming the reservation that includes a supplier confirmation number. In some cases, a supplier confirmation number can appear under different names such as, for example, a record locator, a passenger name record (PNR) record locator, a supplier confirmation number', a confirmation number, etc. In some embodiments of airline reservation systems, a record locator is an alphanumeric or alpha code used to access a specific record. A record locator can typically be six characters in length. A record locator is a pointer to a specific reservation known as a Passenger Name Record (PNR). Record locators may be unique within a system at a specific point in time. When a reservation is made in a particular system, the particular system generates a PNR that includes a record locator. If the reservation is been made through an airline vendor and the flights in the reservation are operated by the airline vendor, only one PNR is generated for the reservation. However, if the reservation includes flights operated by other airline vendors, then the reservation for both flights will be made through the airline vendor, but the airline vendor will send messages to the other airline vendor confirming the reservation and the other airline vendor will create a separate PNR that includes its own record locator.

To determine whether the cancelation of the travel plan matches the particular travel plan of the particular trip based on supplier confirmation numbers, import manager 130 determines whether the file includes a supplier confirmation number. If so, import manager 130 determines whether the particular travel plan of the particular trip includes a supplier confirmation number. If so, import manager 130 determines whether the supplier confirmation numbers match or one of the supplier confirmation numbers is a substring of the other supplier confirmation number. If so, import manager 130 determines that the cancelation of the travel plan matches the particular travel plan of the particular trip. If the file does not include a supplier confirmation number; the particular travel plan of the particular trip does not include a supplier confirmation number; or the file includes a supplier confirmation number and the particular travel plan of the particular trip includes a supplier confirmation number, but the supplier confirmation numbers do not match and neither of the supplier confirmation numbers is a substring of the other supplier confirmation number, import manager 130 attempts to determine whether the cancelation of the travel plan matches the particular travel plan of the particular trip based on booking site confirmation numbers.

In some embodiments, a booking site confirmation number is a unique identifier generated and used by a booking website to identify a reservation in the booking website's system. In some such embodiments, a booking website allows a user to make reservations with any number of different vendors through the booking website. When a user makes a reservation with a particular vendor through a booking site, the booking site generates a booking site confirmation number for the reservation. The reservation made with the particular vendor generates a supplier confirmation number for the reservation that the booking site made with the particular vendor on behalf of the user. The booking site may send the user an email confirmation that includes the booking site confirmation number and the supplier confirmation number.

To determine whether the cancelation of the travel plan matches the particular travel plan of the particular trip based on booking site confirmation numbers, import manager 130 determines whether the file includes a booking site confirmation number. If so, import manager 130 determines whether the particular travel plan of the particular trip includes a booking site confirmation number. If so, import manager 130 determines whether the booking site confirmation numbers match. If the numbers match, import manager 130 determines that the cancelation of the travel plan matches the particular travel plan of the particular trip. If the file does not include a booking site confirmation number; the particular travel plan of the particular trip does not include a booking site confirmation number; or the file includes a booking site confirmation number and the particular travel plan of the particular trip includes a booking site confirmation number, but the booking site confirmation numbers do not match, import manager 130 determines whether the file includes a supplier confirmation number. If so, import manager 130 determines whether the particular travel plan of the particular trip includes a booking site confirmation number. If so, import manager 130 determines whether the supplier confirmation number of the file matches the booking site confirmation number of the particular travel plan of the particular trip. If the numbers match, import manager 130 determines that the cancelation of the travel plan matches the particular travel plan of the particular trip. If the file does not include a supplier confirmation number; the particular travel plan of the particular trip does not include a booking site confirmation number; or the file includes a supplier confirmation number and the particular travel plan of the particular trip includes a booking site confirmation number, but the confirmation numbers do not match, import manager 130 determines whether the file includes a booking site confirmation number. If so, import manager 130 determines whether the particular travel plan of the particular trip includes a supplier confirmation number. If so, import manager 130 determines whether the booking site confirmation number of the file matches the supplier confirmation number of the particular travel plan of the particular trip. If the numbers match, import manager 130 determines that the cancelation of the travel plan matches the particular travel plan of the particular trip. If the file does not include a booking site confirmation number; the particular travel plan of the particular trip does not include a supplier confirmation number; or the file includes a booking site confirmation number and the particular travel plan of the particular trip includes a supplier confirmation number, but the confirmation numbers do not match, import manager 130 attempts to determine whether the cancelation of the travel plan matches the particular travel plan of the particular trip based on record locators.

To determine whether the cancelation of the travel plan matches the particular travel plan of the particular trip based on record locators, import manager 130 determines whether the whether the file includes a supplier confirmation number. If so, import manager 130 determines whether the particular travel plan of the particular trip includes a record locator. If so, import manager 130 determines whether the supplier confirmation number of the file matches the record locator of the particular travel plan of the particular trip. If the numbers match, import manager 130 determines that the cancelation of the travel plan matches the particular travel plan of the particular trip. If the file does not include a supplier confirmation number; the particular travel plan of the particular trip does not include a record locator; or the file includes a supplier confirmation number and the particular travel plan of the particular trip includes a record locator, but the supplier confirmation number of the file does not match the record locator of the particular travel plan of the particular trip, import manager 130 determines whether the file includes a booking site confirmation number. If so, import manager 130 determines whether the particular travel plan of the particular trip includes a record locator. If so, import manager 130 determines whether the booking site confirmation number of the file matches the record locator of the particular travel plan of the particular trip. If the numbers match, import manager 130 determines that the cancelation of the travel plan matches the particular travel plan of the particular trip. If the file does not include a booking site confirmation number; the particular travel plan of the particular trip does not include a record locator; or the file includes a booking site confirmation number and the particular travel plan of the particular trip includes a record locator, but the booking site confirmation number of the file does not match the record locator of the particular travel plan of the particular trip, import manager 130 determines whether the file includes a record locator. If so, import manager 130 determines whether the particular travel plan of the particular trip includes a record locator. If so, import manager 130 determines whether the record locators match. If so, import manager 130 determines that the cancelation of the travel plan matches the particular travel plan of the particular trip. If the file does not include a record locator; the particular travel plan of the particular trip does not include a record locator; or the file includes a record locator and the particular travel plan of the particular trip includes a record locator, but the record locators do not match, import manager 130 determines whether import manager 130 received an indication from data mapping manager 125 that confirmation number need to match. If not, import manager 130 determines whether the file includes a supplier confirmation number, a booking site confirmation number, or a record locator; and the particular travel plan of the particular trip includes a supplier confirmation number, a booking site confirmation number, or a record locator. If so, import manager 130 determines that the cancelation of the travel plan does not match the particular travel plan of the particular trip. Otherwise, import manager 130 determines whether import manager 130 received an indication from data mapping manager 125 that confirmation numbers need to not conflict. If so, import manager 130 determines that the cancelation of the travel plan matches the particular travel plan of the particular trip. Otherwise, import manager 130 determines whether the cancelation of travel plan is for a flight reservation. If not, import manager 130 determines that the cancelation of the travel plan does not match the particular travel plan of the particular trip. Otherwise, import manager 130 attempts to determine whether the cancelation of the travel plan matches the particular travel plan of the particular trip based on reservation type-specific data (e.g., hotel-specific reservation data, flight-specific reservation data, car rental-specific reservation data, accommodation-specific reservation data, cruise-specific reservation data, restaurant-specific reservation data, etc.).

To determine whether the cancelation of the travel plan matches the particular travel plan of the particular trip based on reservation type-specific data, import manager 130 determines the type of reservation data included in the file. Next, data import manager 130 determines whether fields in the file matches the values in corresponding fields in the particular travel plan of the particular trip. For example, data import manager 130 determines, for flight reservation data, whether the values in the following fields of the file matches the values in corresponding fields of the particular travel plan of the particular trip: departure airport, arrival airport, departure date, arrival date, departure time, arrival time, marketing airline, operating airline, marketing flight number, and operating flight number. In some embodiments, import manager 130 may ignore the departure time field and the arrival time field (e.g., when import manager 130 receives an indication from data mapping manager 125 to ignore those fields). In some cases, any of the marketing airline, operating airline, marketing flight number, and operating flight number fields of the file and the corresponding field in the particular travel plan of the particular trip can both have null values and still be considered as matching. As another example, data import manager 130 determines, for accommodation reservation data, whether the values in the following fields of the file matches the values in corresponding fields of the particular travel plan of the particular trip: supplier name, address or location, and date. As yet another example, data import manager 130 determines, for car rental reservation data, whether the values in the following fields of the file matches the values in corresponding fields of the particular travel plan of the particular trip: supplier name, address or location, location name, time, and date.

In some embodiments, import manager 130 determines that the cancelation of the travel plan matches the particular travel plan of the particular trip when the values in all the fields of the file match the corresponding fields of the particular travel plan of the particular trip. In other embodiments, import manager 130 determines that the cancelation of the travel plan matches the particular travel plan of the particular trip when the values in a defined number (e.g., five, six, seven, etc.) of the fields of the file match the corresponding fields of the particular travel plan of the particular trip. In yet other embodiments, import manager 130 determines that the cancelation of the travel plan matches the particular travel plan of the particular trip when the values in a defined percentage (e.g., fifty percent, sixty percent, seventy five percent, etc.) of the fields of the file match the corresponding fields of the particular travel plan of the particular trip.

Import manager 130 iterates through each travel plan of each trip in the retrieved trips and determines whether the cancelation of the travel plan matches the travel plan of the trip using the methodology described above until import manager 130 finds a travel plan of a trip that matches the cancelation of the travel plan. If import manager 130 does not find a travel plan in one of the retrieved trips that matches the cancelation of the travel plan, import manager 130 discards the cancelation of the travel plan. If import manager 130 does find a travel plan in one of the retrieved trips that matches the cancelation of the travel plan, import manager 130 determines whether it already has a cancelation of a travel plan associated with the travel plan in the retrieved trip. If so, import manager 130 discards the cancelation of the travel plan. Otherwise, import manager 130 associates the cancelation of the travel plan with the matching travel plan in the retrieved trip.

Computing system 120 can receive requests from client device 110 for trip data. For instance, computing system 120 may receive from client device 110 a request for trips associated with a user of client device (e.g., an email address of the user of client device 110). In some embodiments, computing system 120 receives the request through a set of application programming interfaces (APIs) provided by computing system 120. In response to such a request, computing system 120 accesses trips storage 140 and retrieves trips associated with the user of client device 110 (e.g., trips associated with an email address of the user of client device 110) and any cancelations of travel plans that may be associated with a travel plan in one of the retrieved trips. Then, computing system 120 sends the trips and, if any, cancelation plans of travel plans, to client device 110. Computing system 120 may also receive from client device 110 a selection to confirm the cancelation of a travel plan of a trip. In response, computing system 120 removes the travel plan from the trip. Also, computing system 120 may also receive from client device 110 a selection to keep a travel plan of a trip. In response, computing system 120 removes association between the cancelation of the travel plan and the travel plan of the trip.

Figure 2:
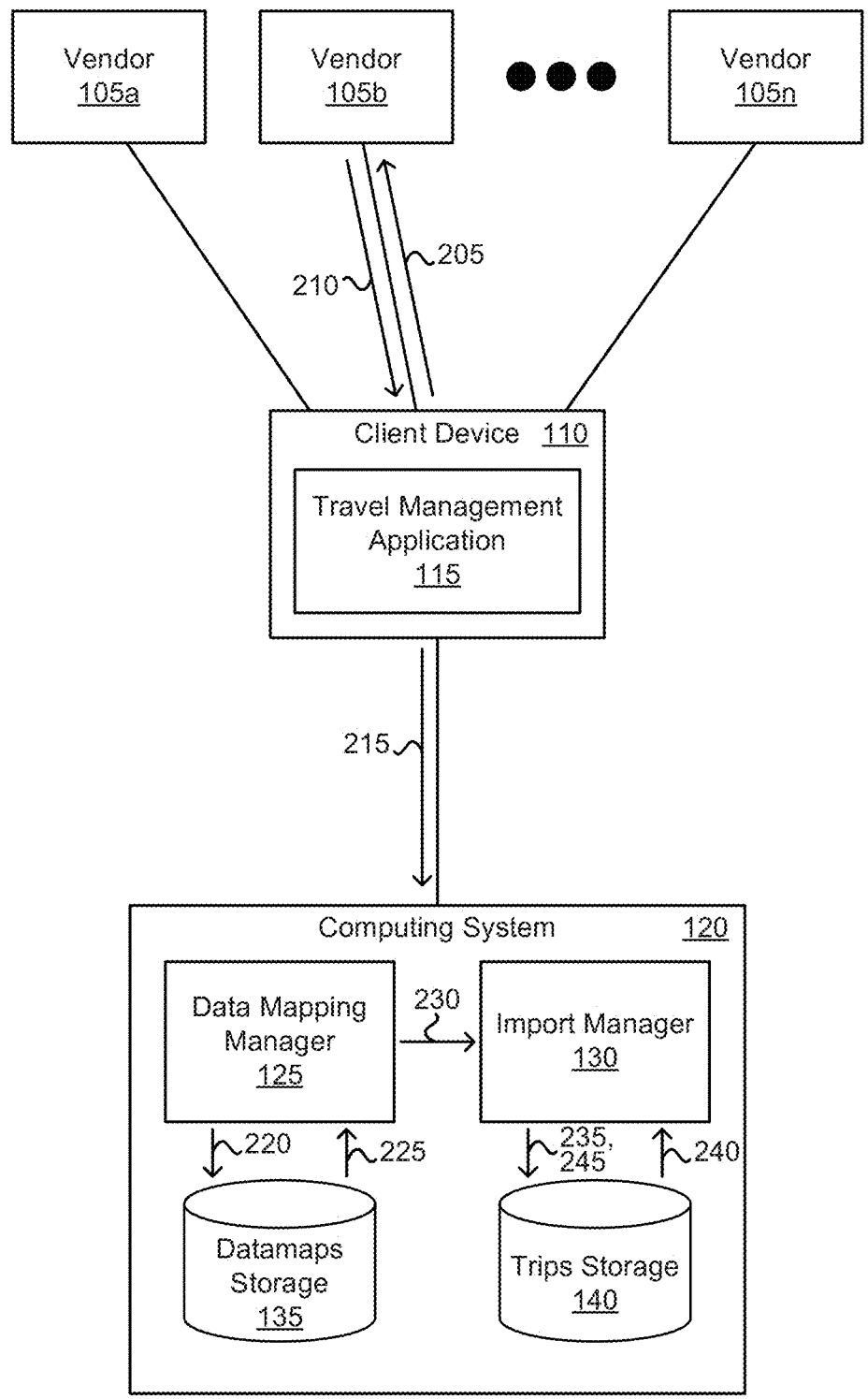
FIG. 2 illustrates an example data flow through the system illustrated in FIG. 1 according to some embodiments.

An example operation will now be described by reference to FIGS. 2-5. FIG. 2 illustrates an example data flow through the system illustrated in FIG. 1 according to some embodiments. The example operation starts by a user of client device 110 accessing, at 205, a website of vendor 105 and canceling a reservation for a travel plan that was previously made by the user of client device 110. In this example, vendor 105b is ACME airlines and the reservation for the travel plan is a flight reservation on a flight operated by ACME airlines. In response to canceling the reservation for the travel plan, vendor 105b sends, at 210, client device 110 a cancelation email for the reservation of the travel plan.

FIG. 3 illustrates an example cancelation email 300 for a travel plan according to some embodiments. Specifically, cancelation email 300 is the cancelation email for this example operation. As shown, cancelation email 300 includes various text indicating that the flight reservation has been canceled as well as other information related to the flight reservation such as a booking reference number ("VRQ76 W" in this example), a passenger name ("Mrs. Jane Doe" in this example), a ticket number ("125-89313751310" in this example), etc.

Returning to FIG. 2, when client device 110 receives cancelation email 300 from vendor 105b, client device 110 sends, at 215, cancelation email 300 to computing system 120 for processing. Upon receiving cancelation email 300, data mapping manager 125 determines a datamap from datamaps stored in datamaps storage 135 that corresponds to cancelation email 300. As mentioned above, in some embodiments, data mapping manager 125 determines a score for each datamap stored in datamaps storage 135 based on the received email (cancelation email 300 in this example), the set of regular expressions in the datamap, and the set of associated weight values in the datamap. Based on the determined scores, data mapping manager 125 identifies a subset of candidate datamaps from the datamaps stored in datamaps storage 135. In some embodiments, the subset of datamaps includes datamaps having scores above a defined threshold score. In this example, the defined threshold score is 60. Next, data mapping manager 125 selects the datamap in the subset of candidate datamaps having the highest score as the datamap that corresponds to the received email.

In this example, data mapping manager 125 determines the datamap shown in FIGS. 4A and 4B as the datamap to use to process cancelation email 300. FIGS. 4A and 4B illustrate a datamap 400 for processing the cancelation email illustrated in FIG. 3 according to some embodiments. As shown, datamap 400 in FIG. 4A includes four regular expressions (referred to as attributes in this example) and four corresponding weight values. In particular, the first attribute has a corresponding weight value of 100, the second attribute has a corresponding weight value of 200, the third attribute has a corresponding weight value of 100, and the fourth attribute has a corresponding weight value of 100. To determine the score for datamap 400, data mapping manager 125 determines whether each of the attributes in datamap 400 matches a string in cancelation email 300. For each regular expression that matches a string in cancelation email 300, data mapping manager 125 adds the corresponding weight value to a running total of weight values. In this example, each of the regular expressions in datamap 400 matches a string in cancelation email 300. Therefore, data mapping manager 125 determines the running total of weight values for datamap 400 to be 500. Data mapping manager 125 calculates the score for datamap 400 by dividing the running total of weight values by the maximum possible total of weight values (500 in this example) and then multiplying by the value 100. Therefore, data mapping manager 125 calculates the score for datamap 400 to be 100 (i.e., 500÷500×100) in this example, which is the highest score among other scores that data mapping manager 125 calculates for other datamaps scored in datamaps storage 135.

Once data mapping manager 125 determines that datamap 400 corresponds to cancelation email 300, data mapping manager 125 executes datamap 400 on cancelation email 300 in order to parse through and extract data from cancelation email 300. Data mapping manager 125 executes datamap 400 by iterating through datamap 400 and evaluating the regular expressions specified in datamap 400 (e.g., the regular expressions illustrated in FIG. 4B) against cancelation email 300 in order to identify data in cancelation email 300 and extract them. After extracting data from cancelation email 300, data mapping manager 125 normalizes the extracted data. Next, data mapping manager 125 generates a file and stores the normalized data in the file. In some embodiments, the organization structure of datamap 400 may follow the structure of the generated file that stores the extracted data. In addition, data mapping manager 125 stores data derived from data extracted from the received email. For this example, datamap 400 extracts data indicating that cancelation email 300 is a cancelation email for a travel plan and stores a value for a flag in the file indicating that the email is a cancelation email for a travel plan.

FIG. 5 illustrates an extensible markup language (XML) file 500 generated based on the cancelation email illustrated in FIG. 3 and the datamap illustrated in FIGS. 4A and 4B according to some embodiments. For this example, data mapping manager 125 generates file 500 and stores the extracted and normalized data from cancelation email 300 in file 500. As illustrated, file 500 includes booking element 505, which represents a travel plan (a flight reservation in this example). Booking element 505 includes datamap version element 510, email date element 515, email from address element 520, and air object element 525. Datamap version element 510 stores the name of the datamap used to generate file 500 (datamap 400 in this example). Email date element 515 stores the date of cancelation email 300. Email from address element 520 stores the email address of the user of client device 110 from which data import manager 125 received cancelation email 300. Air object element 525 includes booking site name element 530, supplier confirmation number element 535, cancelation flag element 540, and traveler element 545. Booking site name element 530 stores the name of the booking site used to book the flight reservation. Supplier confirmation number element 535 stores the confirmation number of the flight reservation (which vendor 105b generated and sent to client device 110 in an email confirmation for the flight reservation). Cancelation flag element 540 stores a flag indicating whether cancelation email 300 is a cancelation email for a reservation of a travel plan. For this example, cancelation flag element 540 stores a value of "true" since cancelation email 300 is a cancelation email for a reservation of a travel plan. Traveler element 545 includes last name element 550, which stores the last name of the passenger for which the reservation is reserved, and first name element 555, which stores the first name of the passenger for which the reservation is reserved. After data mapping manager 125 generates file 500, data mapping manager 125 sends file 500 to import manager 130 for processing.

When import manager 130 receives file 500, import manage 130 determines whether the cancelation email 300 is a confirmation email for a reservation or a cancelation email for a travel plan based on data in the file. Specifically, import manager 130 examines cancelation flag element 540 in file 500 to determine whether the flag indicates cancelation email 300 is a cancelation email for a travel plan. For this example, cancelation flag element 540 indicates that cancelation email 300 is a cancelation email for a travel plan. Next, import manager 130 accesses trips storage 140 and retrieves trips associated with the email address stored in email from address element 520. Then, import manager 130 iterates through each travel plan of each retrieved trip and determines whether the cancelation of the travel plan matches the travel plan of the trip using the techniques described above by reference to FIG. 1. If import manager 130 does not find a travel plan in one of the retrieved trips that matches the cancelation of the travel plan, import manager 130 discards the cancelation of the travel plan. If import manager 130 does find a travel plan in one of the retrieved trips that matches the cancelation of the travel plan, import manager 130 determines whether the matching travel plan of the trip already has a cancelation of a travel plan associated with it. If so, import manager 130 discards the cancelation of the travel plan. Otherwise, import manager 130 associates the cancelation of the travel plan with the matching travel plan of the trip. In some embodiments, import manager 130 associates the cancelation of the travel plan with the matching travel plan of the trip by associating the data in file 500 with the matching travel plan of the trip stored in trips storage 140. In other embodiments, import manager 130 associates the cancelation of the travel plan with the matching travel plan of the trip by associating file 500 with the matching travel plan of the trip stored in trips storage 140.

Figure 6:
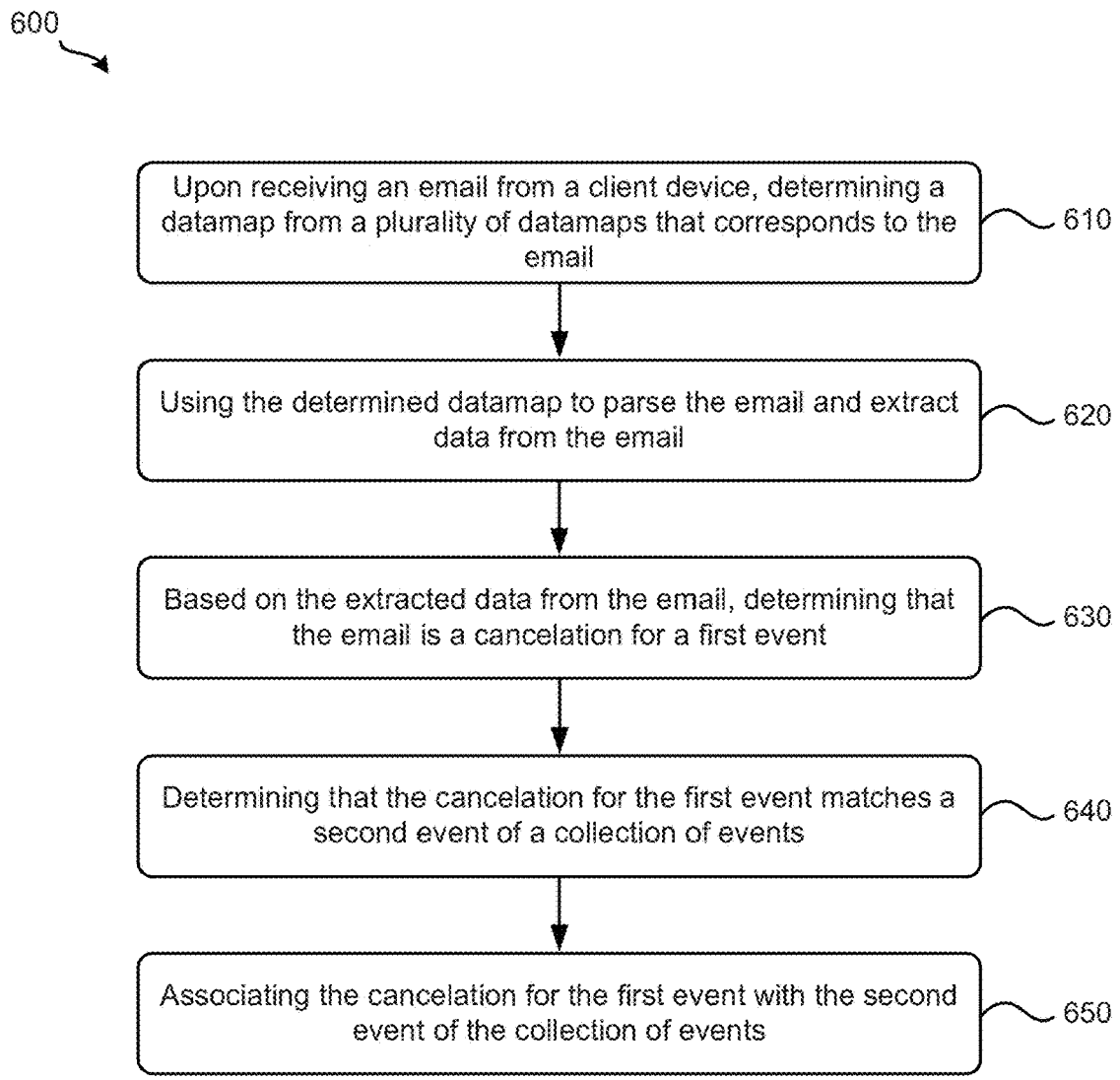
FIG. 6 illustrates a process for processing a cancelation email for an event according to some embodiments.

FIG. 6 illustrates a process 600 for processing a cancelation email for an event according to some embodiments. In some embodiments, computing system 120 performs process 600. Upon receiving an email from a client device, process 600 determines, at 610, a datamap from a plurality of datamaps that corresponds to the email. Referring to FIGS. 1, 3, and 4 as an example, data mapping manager 125 may receive cancelation email 300 from client device 110. In response, data mapping manager 125 can determine datamap 400 from datamaps stored in datamaps storage 135 that corresponds to cancelation email 300.

Next, process 600 uses, at 620, the determined datamap to parse the email and extract data from the email. Referring to FIGS. 1 and 3-5 as an example, data mapping manager 125 can use datamap 400 to parse and extract data from cancelation email 300. After extracting data from cancelation email 300, data mapping manager 125 may normalize the extracted data. Data mapping manager 125 then generates file 500 and stores the normalized data in file 500 along with data derived from data extracted from cancelation email 300 (e.g., a value for a flag in the file indicating that the email is a cancelation email for a travel plan derived based on data indicating that cancelation email 300 is a cancelation email for a travel plan). Based on the extracted data from the email, process 600 determines, at 630, that the email is a cancelation for a first event. Referring to FIGS. 1, 3, and 5 as an example, import manager 130 may examine cancelation flag element 540 in file 500 to determine that the flag indicates cancelation email 300 is a cancelation email for a travel plan. For this example, cancelation flag element 540 indicates that cancelation email 300 is a cancelation email for a travel plan.

Process 600 then determines, at 640, that the cancelation for the first event matches a second event of a collection of events. Referring to FIGS. 1 and 5 as an example, import manager 130 accesses trips storage 140 and retrieves trips associated with the email address stored in email from address element 520. Next, import manager 130 iterates through each travel plan of each retrieved trip and determines whether the cancelation of the travel plan matches the travel plan of the trip using the techniques described above by reference to FIG. 1. Finally, process 600 associates, at 650, the cancelation for the first event with the second event of the collection of events. Referring to FIGS. 1 and 5 as an example, import manager 130 determines that the matching travel plan of the trip does not have a cancelation of a travel plan already associated with it. Therefore, import manager 130 associates the cancelation of the travel plan with the matching travel plan of the trip (e.g., by associating the data in file 500 and/or file 500 with the matching travel plan of the trip stored in trips storage 140).

Figure 7:
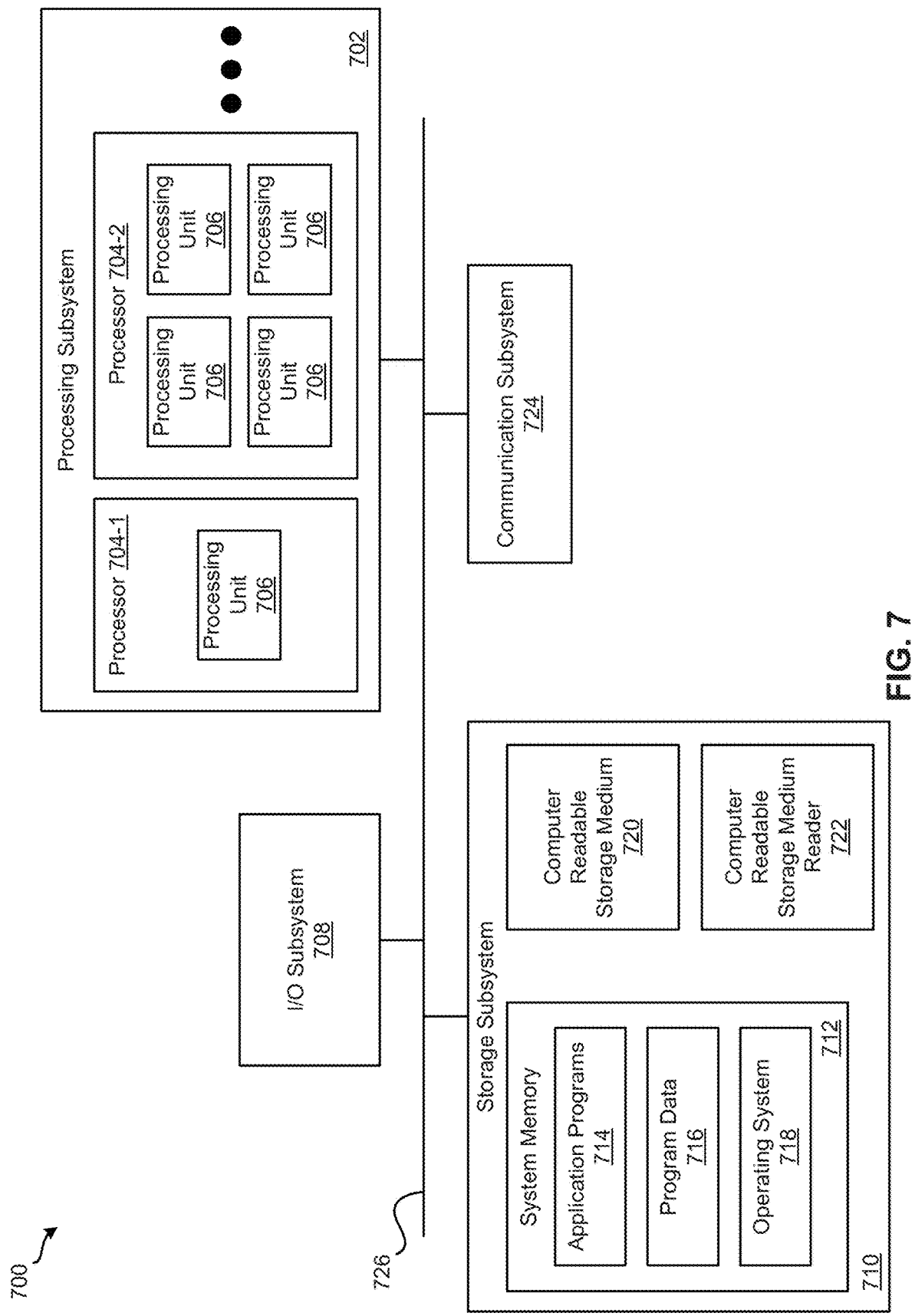
FIG. 7 illustrates an exemplary computer system, in which various embodiments may be implemented.

FIG. 7 illustrates an exemplary computer system 700 for implementing various embodiments described above. For example, computer system 700 may be used to implement vendors 105*a-n*, client device 110, and computing system 120. Computer system 700 may be a desktop computer, a laptop, a server computer, or any other type of computer system or combination thereof. Some or all elements of travel management application 115, data mapping manager 125 and import manager 130, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600, etc.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714, program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., travel management application 115, data mapping manager 125 and import manager 130) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
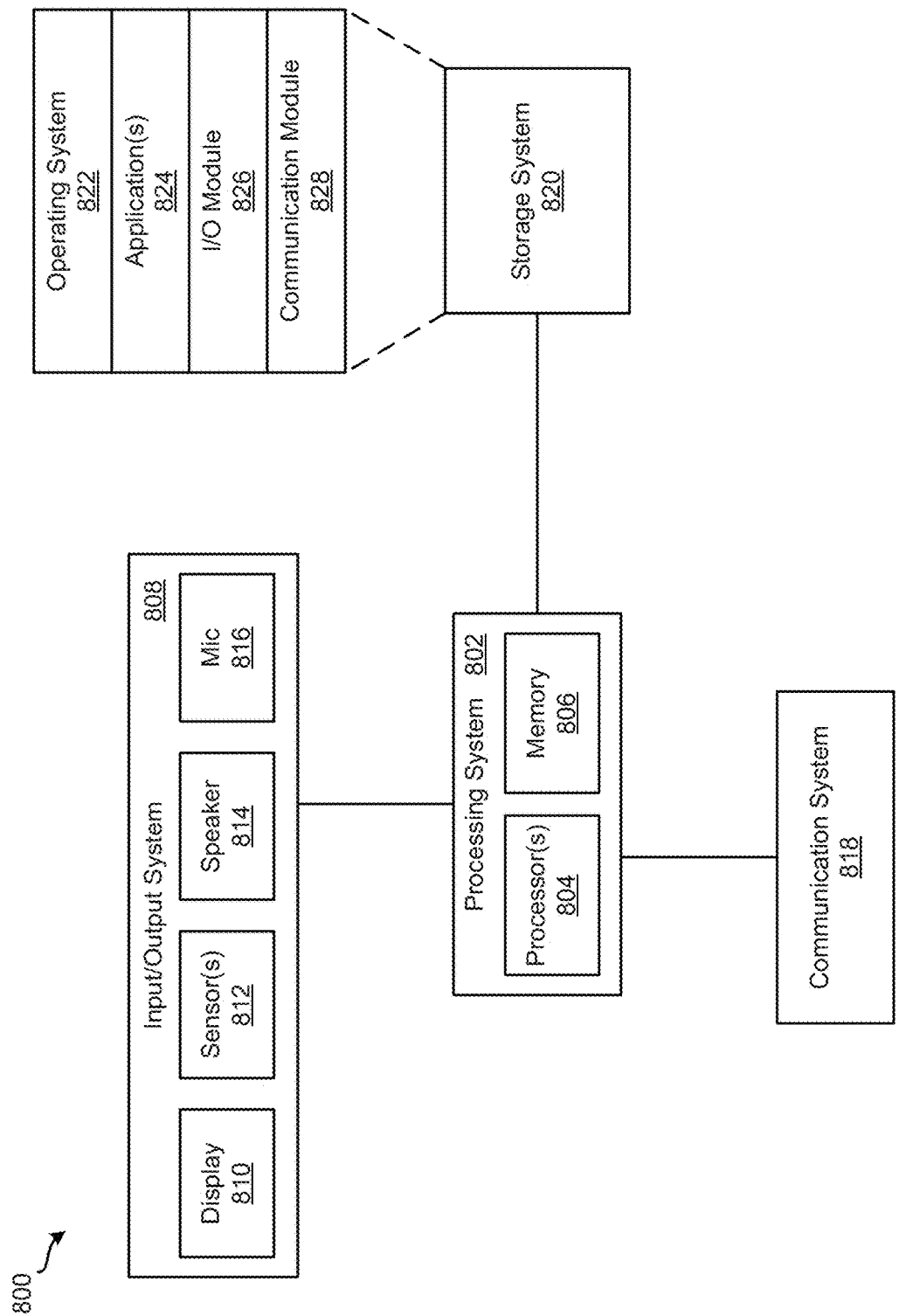
FIG. 8 illustrates an exemplary computing device, in which various embodiments may be implemented.

FIG. 8 illustrates an exemplary computing device 800 for implementing various embodiments described above. For example, computing device 800 may be used to implement client device 110. Computing device 800 may be a cellphone, a smartphone, a wearable device, an activity tracker or manager, a tablet, a personal digital assistant (PDA), a media player, or any other type of mobile computing device or combination thereof. Some or all elements of travel management application 115, or combinations thereof can be included or implemented in computing device 800. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., travel management application 85) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. For example, travel management application 115 may be installed on computing device 800. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
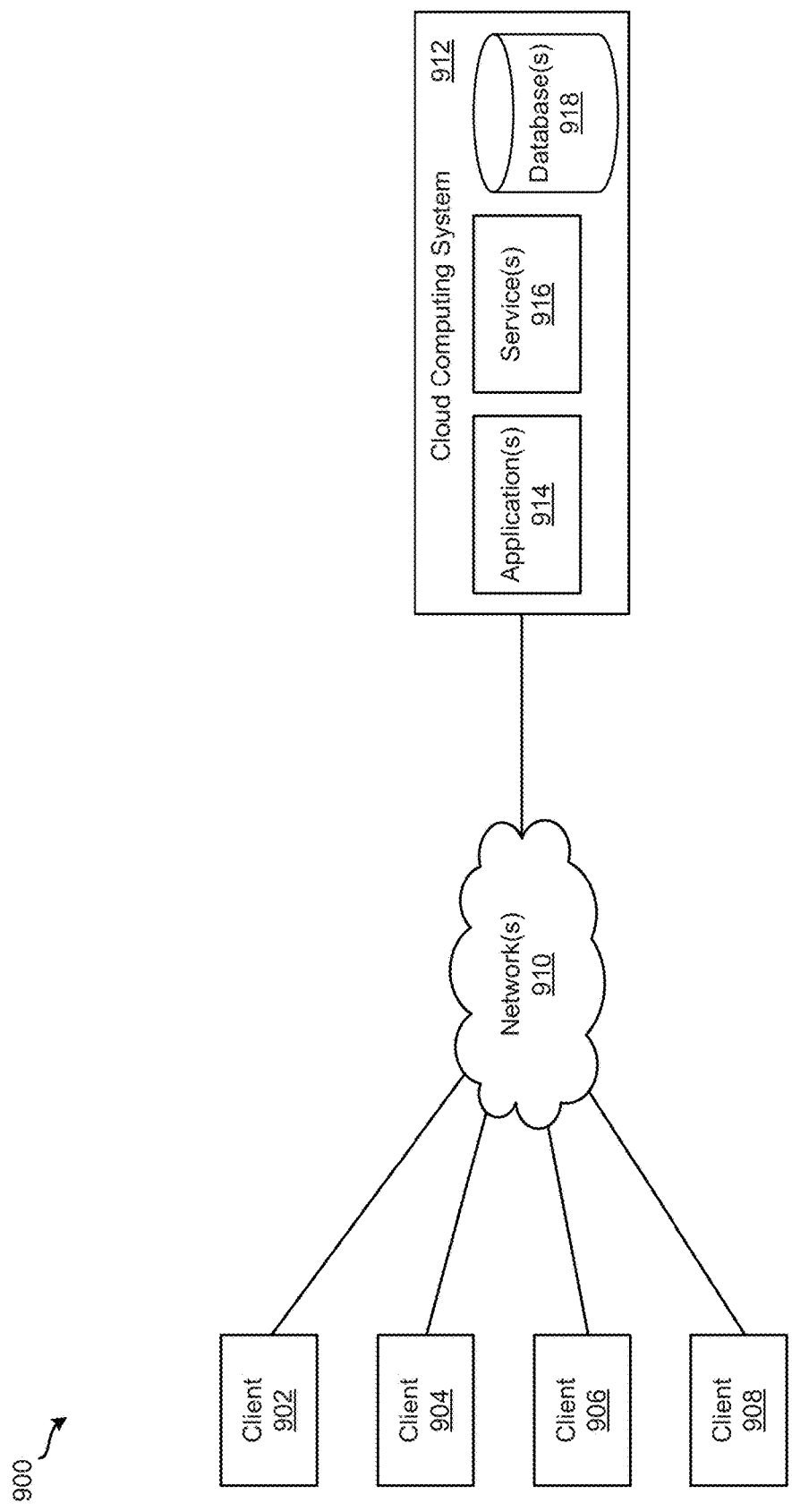
FIG. 9 illustrates an exemplary system, in which various embodiments may be implemented.

FIG. 9 illustrates an exemplary system 900 for implementing various embodiments described above. For example, one of client devices 902-908 may be used to implement client device 110 and cloud computing system 912 may be used to implement computing system 120. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 135 and 140 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 1000 or computing device 1100, as described above by reference to FIGS. 10 and 11, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   upon receiving an email from a client device, determining a datamap from a plurality of datamaps that corresponds to the email;
   using the determined datamap to parse the email and extract data from the email;
   based on the extracted data from the email, determining that the email is a cancelation for a first event;
   determining that the cancelation for the first event matches a second event of a collection of events; and
   associating the cancelation for the first event with the second event of the collection of events.

2. The non-transitory machine-readable medium of claim 1, wherein the program further comprises sets of instructions for:
   receiving a request from the client device for the collection of events; and
   sending the client device the collection of events and the associated cancelation of the first event.

3. The non-transitory machine-readable medium of claim 2, wherein the program further comprises sets of instructions for:
   receiving from the client device an indication of a confirmation of the cancelation of the first event; and
   in response to receiving the indication, deleting the second event from the collection of events.

4. The non-transitory machine-readable medium of claim 2, wherein the program further comprises sets of instructions for:
   receiving from the client device an indication to keep the second event of the collection of events; and
   in response to receiving the indication, removing the cancelation of the first event from the collection of events.

5. The non-transitory machine-readable medium of claim 1, wherein the program further comprises a set of instructions for identifying a user account associated with a user of the client device, wherein determining that the cancelation for the first event matches the second event of the collection of events comprises:
   retrieving a set of collection of events associated with the user account; and
   identifying a collection of events from the set of collection of events as the collection of events having the second event.

6. The non-transitory machine-readable medium of claim 1, wherein determining the datamap from the plurality of datamaps that corresponds to the email comprises:
   generating a score for each datamap in a subset of the plurality of datamaps; and
   based on the scores, identifying the datamap with the highest score as the determined datamap.

7. The non-transitory machine-readable medium of claim 1, wherein each datamap in the plurality of datamaps is configured to parse a particular type of email sent from a particular entity and extract data from the particular type of email sent from the particular entity.

8. A method, executable by a device, comprising:
   upon receiving an email from a client device, determining a datamap from a plurality of datamaps that corresponds to the email;
   using the determined datamap to parse the email and extract data from the email;
   based on the extracted data from the email, determining that the email is a cancelation for a first event;
   determining that the cancelation for the first event matches a second event of a collection of events; and
   associating the cancelation for the first event with the second event of the collection of events.

9. The method of claim 8 further comprising:
   receiving a request from the client device for the collection of events; and
   sending the client device the collection of events and the associated cancelation of the first event.

10. The method of claim 9 further comprising:
    receiving from the client device an indication of a confirmation of the cancelation of the first event; and
    in response to receiving the indication, deleting the second event from the collection of events.

11. The method of claim 9 further comprising:
    receiving from the client device an indication to keep the second event of the collection of events; and
    in response to receiving the indication, removing the cancelation of the first event from the collection of events.

12. The method of claim 8 further comprising identifying a user account associated with a user of the client device, wherein determining that the cancelation for the first event matches the second event of the collection of events comprises:
    retrieving a set of collection of events associated with the user account; and
    identifying a collection of events from the set of collection of events as the collection of events having the second event.

13. The method of claim 8, wherein determining the datamap from the plurality of datamaps that corresponds to the email comprises:
    generating a score for each datamap in a subset of the plurality of datamaps; and
    based on the scores, identifying the datamap with the highest score as the determined datamap.

14. The method of claim 8, wherein each datamap in the plurality of datamaps is configured to parse a particular type of email sent from a particular entity and extract data from the particular type of email sent from the particular entity.

15. A system comprising:
    a set of processing units; and
    a non-transitory machine-readable medium storing instructions that when executed by at least one processing unit in the set of processing units cause the at least one processing unit to:
    upon receiving an email from a client device, determine a datamap from a plurality of datamaps that corresponds to the email;
    use the determined datamap to parse the email and extract data from the email;
    based on the extracted data from the email, determine that the email is a cancelation for a first event;
    determine that the cancelation for the first event matches a second event of a collection of events; and
    associate the cancelation for the first event with the second event of the collection of events.

16. The system of claim 15, wherein the instructions further cause the at least one processing unit to:
   receive a request from the client device for the collection of events; and
   send the client device the collection of events and the associated cancelation of the first event.

17. The system of claim 16, wherein the instructions further cause the at least one processing unit to:
   receive from the client device an indication of a confirmation of the cancelation of the first event; and
   in response to receiving the indication, delete the second event from the collection of events.

18. The system of claim 16, wherein the instructions further cause the at least one processing unit to:
   receive from the client device an indication to keep the second event of the collection of events; and
   in response to receiving the indication, remove the cancelation of the first event from the collection of events.

19. The system of claim 15, wherein the instructions further cause the at least one processing unit to identify a user account associated with a user of the client device, wherein determining that the cancelation for the first event matches the second event of the collection of events comprises:
   retrieving a set of collection of events associated with the user account; and
   identifying a collection of events from the set of collection of events as the collection of events having the second event.

20. The system of claim 15, wherein determining the datamap from the plurality of datamaps that corresponds to the email comprises:
   generating a score for each datamap in a subset of the plurality of datamaps; and
   based on the scores, identifying the datamap with the highest score as the determined datamap.

* * * * *